June 2, 1959 R. T. JENKINS 2,889,550

SIGNALING SYSTEM

Filed Aug. 27, 1957 2 Sheets-Sheet 1

INVENTOR
R. T. JENKINS
BY John C. Morris
ATTORNEY

June 2, 1959 R. T. JENKINS 2,889,550

SIGNALING SYSTEM

Filed Aug. 27, 1957 2 Sheets-Sheet 2

INVENTOR
R. T. JENKINS
BY John C. Morris
ATTORNEY

United States Patent Office 2,889,550
Patented June 2, 1959

2,889,550

SIGNALING SYSTEM

Reginald T. Jenkins, Summit, N.J., assignor to Bell Telephone Laboratories, Incorporated, New York, N.Y., a corporation of New York Application August 27, 1957, Serial No. 680,477

2 Claims. (Cl. 340—400)

This invention relates to signaling systems, and more particularly to telephone signaling systems which include electromagnetically-operated ringing devices.

The signaling equipment commonly employed at a telephone subscriber's station includes an electromagnetically-operated device, generally referred to as a telephone ringer, which responds to each application of ringing current to the subscriber's line to produce an attention-arresting sound signal.

The furnishing of a complete range of telephone service extends to providing a variety of types of sound signals. For reasons of economy, however, it is essential that the various systems required to produce these signals be compatible with, and entail only easily made modifications of, existing telephone installations.

An object of this invention is a new and improved signaling system.

Another object of this invention is a signaling system which provides a chime-type sound output.

A still further object of the present invention is a signaling system which is compatible with, and involves only easily made modifications of, existing signaling circuits and apparatus.

These and other objects of the present invention are realized in an illustrative embodiment thereof wherein a system for supplying alternating ringing current to a winding of a telephone ringer is modified to include a full-wave bridge-type rectifier assembly, a resistor, a capacitor and a ringer armature-actuated contact element.

The rectifier assembly, which is connected across the conductors carrying ringing current to a subscriber's station, converts the alternating ringing signal to a direct current signal, which direct current is then supplied to the ringer winding by a novel circuit arrangement. The supplying circuit includes the noted capacitor arranged in parallel with the above-mentioned resistor and a ringer armature-operated contact element, the resistor and contact element being arranged in series circuit relation with each other.

Accordingly, a feature of the present invention is a signaling system comprising a pair of conductors having a source of alternating current ringing power connected to one end thereof and a telephone ringer connected to the other end thereof, a full-wave rectifier connected to the pair between the ringer and the ringing power source, and an interrupter assembly connected between the rectifier and the ringer, the interrupter assembly including a capacitor arranged in parallel with a series-related resistor and ringer armature-actuated contact element.

In accordance with aspects of this invention there is provided a signaling system for controlled, repetitive, single stroke chime operation of a conventional-type ringer device.

A complete understanding of the present invention may be gained from a consideration of the following detailed description in conjunction with the accompanying drawing, in which.

Figure 3A:
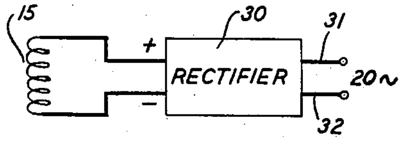
Figure 3B:
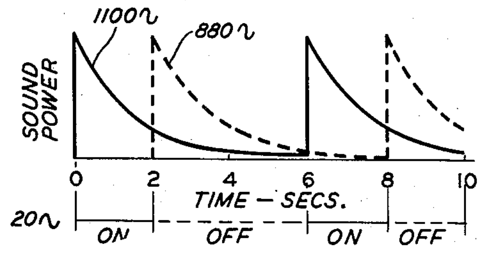
Figure 4A:
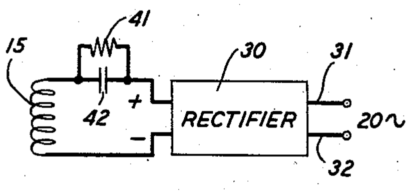
Figure 4B:
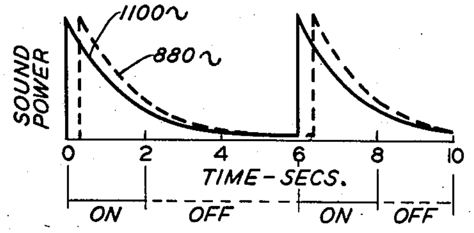
Figure 5A:
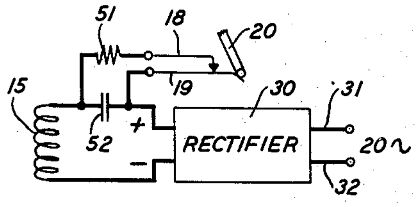
Figure 5B:
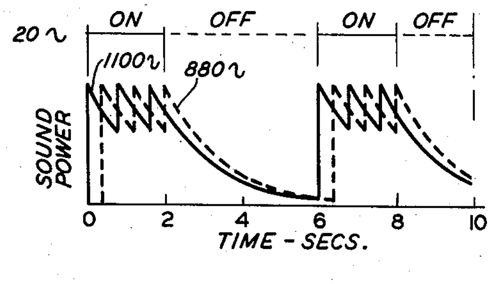

Figs. 3A and 3B, respectively, show a chime-type signaling system, and the sound output of such a system plotted as a function of the time during which ringing power is applied to the system;

Figs. 4A and 4B, respectively, show another chime-type signaling system, and the sound output of such a system plotted as a function of the time during which ringing power is applied to the system; and Figs. 5A and 5B, respectively, show a chime-type signaling system illustrative of the principles of this invention, and the sound output of such an illustrative system plotted as a function of the time during which ringing power is applied thereto.

Figure 1:
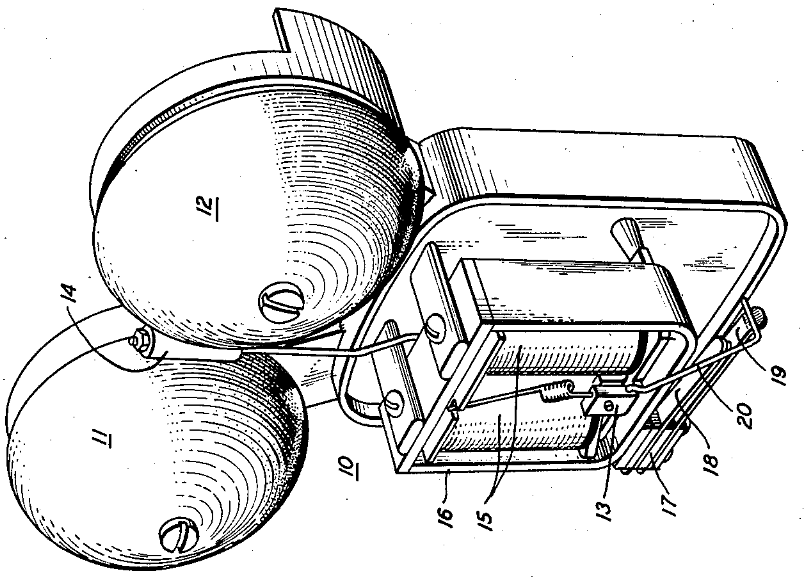
Fig. 1 is a perspective view of a ringer device designed to be employed in a signaling system illustrative of the principles of the present invention.

The ringer structure shown in Fig. 1 will not be described herein in detail, for by now such a structure is well known to those skilled in the art of telephone ringers. Furthermore, the basic principles of this invention are not restricted to a signaling system having a ringer device of the specific type shown in Fig. 1.

Briefly then, the ringer 10 of Fig. 1 includes two gong assemblies 11 and 12, an armature 13, a clapper assembly 14 having its lower end secured to the armature 13, a ringer winding 15, a frame assembly 16, a switch assembly 17 attached to the frame assembly 16 (the switch assembly 17 including contact fingers 18 and 19 which are normally in closed circuit or contacting relation), and a contact actuating arm 20 which is staked or otherwise suitably secured to the armature 13.

Figure 2:
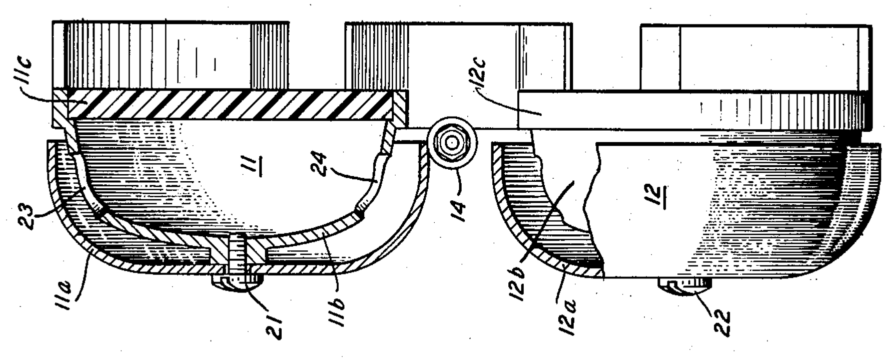
Fig. 2 is a top view, partially in section and with parts broken away, of the device of Fig. 1.

Fig. 2 clearly shows the structure of the gong assemblies 11 and 12. The assembly 11 includes a gong **11*a* and a nested resonator 11*b* secured to the gong 11*a* by a fastening member 21. Similarly, the assembly 12 includes a gong 12*a* and a nested resonator 12*b* secured thereto by a fastening member 22. The assemblies 11 and 12 also respectively include back plate members 11*c* and 12*c***.

The resonators **11*b* and 12*b* may be respectively "tuned" to the fundamental frequencies of the gongs 11*a* and 12*a* by means of openings in the resonator shells 11*b* and 12*b* and/or in the back plates 11*c* and 12*c*. It is noted that the thicknesses of the gongs 11*a* and 12*a* may advantageously be so chosen that their fundamental frequencies are related in a tonally pleasing manner. For example, one specific system illustrative of the principles of the present invention includes a ringer of the type shown in Figs. 1 and 2 wherein the fundamental frequency of the thicker gong 12*a* is 1100 cycles per second, and that of the thinner going 11*a*** is 880 cycles per second.

Referring now to Fig. 3A, there is shown a full-wave bridge-type rectifier 30 connected between a twenty cycle source of alternating current ringing power and the ringer winding 15 of a device of the type shown in Fig. 1.

Fig. 3B graphically illustrates the fact that at about the first instant that ringing power is applied to the conductors 31 and 32 of Fig. 3A, the rectifier 30 provides a direct current output that flows through the winding 15 and causes the armature 13 to swing the clapper assembly 14 against the gong assembly 12 in a sound-producing manner.

At the end of the two second "on" period of the ringing power cycle (Fig. 3B), the armature 13 is released and the clapper assembly 14, in over-swinging its rest or normal position, strikes the gong assembly 11 to cause it to emit an 880 cycle per second sound signal. Thus, for each six second ringing power cycle there is produced a distinctive and harmonious chime signal output of the "bing-bong" type.

Fig. 4A, which shows a circuit designed to provide short interval, single stroke chime operation during the "on" period of the ringing cycle, is a modification of the basic arrangement shown in Fig. 3A. For such short interval operation a resistor 41 and a capacitor 42 are connected in parallel relation in one leg of the rectifier 30 output.

As explained above in connection with the operation of the circuit of Fig. 3A, at about the first instant that ringing power is applied to the conductors 31 and 32, the rectifier 30 provides a direct current output which is sufficient to make the clapper assembly 14 strike the gong assembly 12. The capacitor 42 of Fig. 4A, however, acquires a steadily increasing charge which eventually reduces the current through the winding 15 to a value insufficient to hold the armature 13 in an operated position. When that point is reached, the clapper assembly 14 is released, and in over-swinging its rest or normal position, strikes the gong assembly 11 in a sound-producing manner.

The interval between gong strikes is a function of the charging time of the capacitor 42 and of the mechanical constants of the ringer armature system. Fig. 4B shows a between-strikes interval of about 0.5 second.

During the "off" period of the ringing cycle, the capacitor 42 of the circuit of Fig. 4A is discharged by the resistor 41. The resistor 41 is chosen to be of a value such that it will discharge the capacitor 42 during the "off" period of the ringing cycle. The value of the resistor 41 must also be chosen so that it will not pass an armature-actuating value of current during the "on" period of the ringer cycle.

To obtain a between-strikes interval of about 0.5 second, when operating from a 90 volt ringing source, values of 20 microfarads and 51,000 ohms for the capacitor 42 and the resistor 41, respectively, have been found suitable.

Fig. 5A, which shows a circuit illustratively embodying some of the basic principles of this invention, is a modification of the circuit of Fig. 4A. The circuit of Fig. 5A provides controlled, repetitive, single stroke chime operation within the "on" period of the ringing cycle.

Shown in Fig. 5A are the ringer armature-actuating arm 20 and the contact fingers 18 and 19, which elements were described above in connection with Fig. 1.

At about the first instant that ringing voltage is applied between the conductors 31 and 32 of Fig. 5A, the rectifier 30 thereof provides a direct current output of sufficient magnitude to operate the armature 13, thereby causing the clapper assembly 14 to strike the gong assembly 12.

In moving, the armature 13 causes the arm 20 attached thereto to move the fingers 18 and 19 out of contacting relation. A capacitor 52 then proceeds to increase its charge, and, as explained above in connection with the operation of the circuit of Fig. 4A, will in time reduce the current through the winding 15 to a below armature-operating value. This may, for example, take place about 0.5 second after the beginning of an "on" period of the ringing cycle, the released clapper assembly then over-swinging its rest or normal position and striking the gong assembly 11 in a sound-producing manner.

The fingers 18 and 19 are restored to a closed circuit or contacting position at the end of the armature return stroke, and the capacitor 52 is then partially discharged through a path formed by the contacting fingers 18 and 19 and the resistor 51, thus again allowing an armature-actuating value of current to flow through the winding 15.

Three repeated armature operations can be obtained during an "on" period of the ringing cycle with a ringing voltage supply of 90 volts and capacitor 52 and resistor 51 value of 40 microfarads and 4,700 ohms, respectively.

In summary, the present invention contemplates the modification of presently employed alternating current ringing power signaling systems of the type having a vibrating bell ringing device to provide reliable, repetitive, single stroke chime operation.

It is to be understood that the above-described arrangements are illustrative and not restrictive of the principles of the present invention. Other arrangements may be devised by those skilled in the art without departing from the spirit and scope of this invention. For example, the principles of the present invention are not restricted to telephone signaling systems, but are equally applicable to the conversion of any vibrating bell system to a chime-type signal.

What is claimed is:

1. A signaling system comprising a pair of conductors having a source of alternating current ringing power connected to one end thereof and a ringer connected to the other end thereof, said ringer including a winding connected to the other end of said conductors, an armature operatively associated with said winding, a full-wave rectifier connected to said pair between said ringer winding and said source, and interrupter means connected to said pair between said ringer and said rectifier for controlled repetitive single stroke chime operation of said ringer, said interrupter means being in series with said ringer winding and including a ringer armature-actuated contact element connected in series with a resistor and a capacitor connected in parallel with said series-related contact elements and resistor.

2. A signaling system comprising a pair of conductors having a source of alternating current ringing power connected to one end thereof, rectifying means connected to said source, interrupter means, and a ringer having a winding and an armature, the output of said rectifying means being connected to said ringer winding through said interrupter means, said interrupter means being in series with one of said pair of conductors and including series-related armature-actuated contact means and resistance means arranged in parallel relation with capacitance means, whereby controlled single stroke repetitive chime operation of said ringer is provided.

References Cited in the file of this patent

UNITED STATES PATENTS

| | | |
|---|---|---|
| 2,269,108 | Hubbell et al. | Jan. 6, 1942 |
| 2,389,082 | Rhoads | Nov. 13, 1945 |
| 2,759,179 | Kircher | Aug. 14, 1956 |

FOREIGN PATENTS

| | | |
|---|---|---|
| 18,462 | Australia | Feb. 18, 1930 |
| 1,012,483 | France | Apr. 9, 1952 |